UNITED STATES PATENT OFFICE 2,031,143

ORTHO - (AMINOAROYL) - BENZOIC ACIDS AND INNER ANHYDRIDES THEREOF AND PROCESS OF PREPARING THEM

Arthur Wolfram and Emil Hausdörfer, Frankfort-on-the-Main-Hochst, Germany, assignors to General Aniline Works, Inc., New York, N. Y., a corporation of Delaware No Drawing. Application January 30, 1929, Serial No. 336,324. In Germany February 7, 1928

12 Claims. (Cl. 260—64)

Our present invention relates to o-(aminoaroyl)-benzoic acids and inner anhydrides thereof and a process of preparing same.

We have found that phthalic acid arylimides of the general formula:

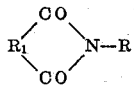

wherein $R_1$ stands for a radical of the benzene series and R stands for a substituted or non-substituted aromatic residue having a free ortho-position to the phthalimide-residue undergo an intramolecular transformation when being treated at an elevated temperature with an acid condensing agent containing chlorine in its molecule. The reaction may advantageously be carried out in the presence of a flux. Phthalic acid phenylimide, for instance, is transformed into the lactam of the o-(2-amino-benzoyl)-benzoic acid according to the formulae:

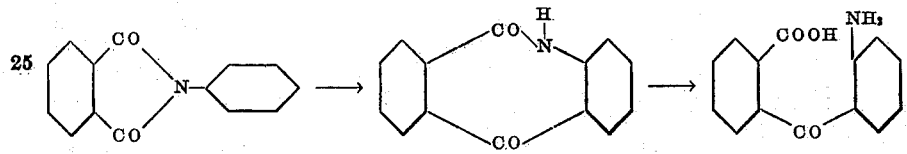

The lactam can easily be split up into the alkali salt of the o-(2-aminobenzoyl)-benzoic acid by heating it with a diluted aqueous alkali solution. The transformation seems in all cases to take place in ortho-position to the nitrogen atom attached to the arylimide residue so that there is obtained, for instance, from the phthalic acid-p-tolylimide the lactam of the o-2-amino-5-methyl-benzoyl benzoic acid of the formula:

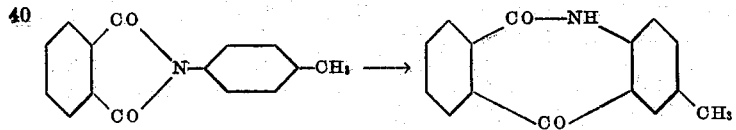

and from phthalic acid-o-chloro-phenylimide, after saponification, the o-(2-amino-3-benzoyl)-benzoic acid of the formula:

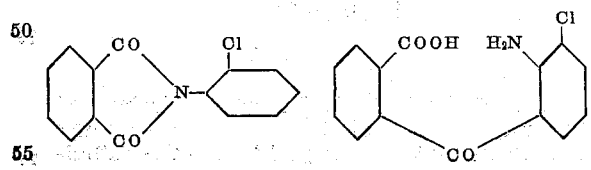

The homologues and substitution products of the phthalic acid phenylimide behave like the phthalic acid phenylimide itself.

The reaction proceeds in the same way as above described, when the phthalic acid-$\alpha$-naphthalimide is used. Also in this case, the carbonyl group reacts in ortho-position to the nitrogen atom attached to the arylimide residue.

Aluminium chloride, zinc chloride, hydrogen chloride or the like, advantageously in the presence of a flux or a diluent, are used as agents for the transformation.

The present process shows a simple way for the manufacture of the aminobenzoyl benzoic acids which are very important for the dyestuff chemistry and which, hitherto, could not be produced at all or only in a very wearisome manner.

The o-(aminobenzoyl)-benzoic acids and their inner anhydrides obtainable according to our new process are compounds of the probable general formula:

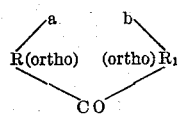

wherein R and $R_1$ stand for radicals of the benzene series, and wherein $a$ represents the carboxylic acid group and $b$ represents the amino group, or $a$ and $b$ jointly stand for the group —CO—NH—.

The following examples serve to illustrate our invention but are not intended to limit it thereto; the parts are by weight:

(1) 100 parts of phthalic acid phenylimide are introduced into a molten mixture of 320 parts of aluminium chloride and 80 parts of sodium chloride at a temperature of about 200°. The temperature is raised to 285° C., while stirring, and melting is continued for about 20 minutes at a temperature of between 285° C. and 290° C. The mass is allowed to cool and decomposed with ice. The decomposition product is boiled with weakly acidified water, and a gray substance is obtained which is washed and dried. The crude lactam of the o-(2-aminobenzoyl)-benzoic acid thus obtained can be recrystallized from nitrobenzene. It forms colorless prisms melting at 245° C. to 246° C.

The lactam may also be purified by dissolving it in a hot caustic soda solution of 5% strength; the mass is then filtered with suction in order to eliminate the insoluble parts and the ortho-(2-aminobenzoyl)-benzoic acid is set free by means of a mineral acid. The light-brown product thus obtained is filtered with suction, washed and recrystallized from methyl alcohol and water. The o-(2-aminobenzoyl)-benzoic acid is obtained in the form of yellow prisms which melt at 195° C. while frothing.

(2) 40 parts of phthalic acid-p-chlorophenyl-imide (melting at 196° C. to 197° C.) are introduced into a molten mass of 160 parts of aluminium chloride and mixed with 40 parts of sodium chloride and the mixture is stirred for 10 minutes at 310° C. After cooling, the product is decomposed with ice, boiled with water and the decomposition product dissolved by boiling it with caustic soda solution of 5% strength. The mass is filtered in order to remove a small residue and the o-(2-amino-5-chlorobenzoyl)-benzoic acid is precipitated by means of a dilute mineral acid, filtered with suction, washed and dried. It crystallizes from methyl alcohol, diluted with water, in the form of yellow prisms which melt at 204° C. to 205° C. while being transformed into the lactam. The lactam is a colorless substance which melts, when recrystallized from nitrobenzene, at about 300° C.

(3) 40 parts of phthalic acid-n-chlorphenyl-imide (melting at 166° C. to 167° C.) are introduced into a melt of 160 parts of aluminium chloride mixed with 40 parts of sodium chloride, and the whole is stirred for about 30 minutes at a temperature of between 300° C. and 310° C. The melt is worked up as described in Example 2 and the colorless o-(2-amino-4-chlorbenzoyl)-benzoic acid melting at 176° C. is obtained.

The acid gives a colorless sodium salt which is sparingly soluble in water and can be used for the purification of the acid. The lactam crystallizes from nitrobenzene in colorless needles melting at 293° C.

(4) 40 parts of phthalic acid-o-chlorphenyl-imide (melting at 143° C.) are introduced into a molten mass of 160 parts of aluminium chloride mixed with 40 parts of sodium chloride and the mixture is caused to react for about 30–35 minutes at a temperature of between 300° C. and 310° C.

The molten mass is worked up as described in Example 2. The o-(2-amino-3-chlorbenzoyl)-benzoic acid is obtained which crystallizes from toluol and melts at 188° C. while frothing.

(5) 20 parts of 3,6-dichlorphthalic acid-phenyl-imide (melting at 191° C.) are introduced into a melt of 80 parts of aluminium chloride mixed with 20 parts of sodium chloride, and the whole is stirred for 40 minutes at 290° C. According to the method described in Example 2, a colorless lactam is obtained crystallizing from glacial acetic acid in the form of long needles and melting at 281° C. The analysis indicates that the compound contains only one chlorine atom. It is easy to obtain from the lactam, in the usual manner, a nearly colorless acid, probably the dichloro-ortho(2-amino-benzoyl)-benzoic acid, which may be recrystallized from methyl alcohol and water and melts at 168° C. while frothing.

(6) 20 parts of phthalic acid-p-bromophenyl-imide (melting at 204° C. to 205° C.) are introduced into a molten mass of 100 parts of aluminium chloride mixed with 25 parts of sodium chloride and the whole is stirred for 20 minutes at 310° C. The lactam is obtained as above described. It crystallizes from glacial acetic acid in colorless needles melting at 285° C. The lactam is split up at an elevated temperature by means of diluted caustic soda solution and the o-(2-amino-5-bromo-benzoyl)-benzoic acid is obtained which is recrystallized from aqueous methyl alcohol and melts at 170° C. while frothing.

(7) 30 parts of phthalic acid-p-tolylimide (melting at 205° C. to 206° C.) are introduced into a melt of 160 parts of aluminium chloride mixed with 40 parts of sodium chloride and the mixture is stirred for ¾ of an hour at 260° C. The lactam of the o-(2-amino-5-methylbenzoyl)-benzoic acid is obtained in the above described manner. It crystallizes from glacial acetic acid in colorless needles and melts at 238° C. to 240° C. When it is split up by means of an alkali, the o-(2-amino-5-methyl-benzoyl)-benzoic acid is obtained, crystallizing from methyl alcohol and water in yellow prisms and melting at 194° C. while frothing.

We claim:

1. A process which comprises treating at an elevated temperature a compound of the following formula:

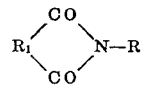

wherein R₁ stands for a radical of the benzene series and R stands for a radical of the benzene series wherein one of the ortho-positions to the phthalimide-radical is non-substituted, with an acid condensing agent containing chlorine in its molecule.

2. A process which comprises treating at an elevated temperature a compound of the following formula:

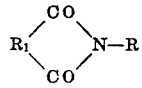

wherein R₁ stands for a radical of the benzene series and R stands for a radical of the benzene series wherein one of the ortho-positions to the phthalimide-radical is non-substituted, in the presence of a flux with an acid condensing agent containing chlorine in its molecule.

3. A process which comprises treating at an elevated temperature a compound of the following formula:

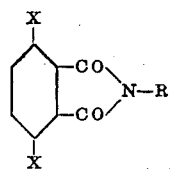

wherein X stands for hydrogen or chlorine and R stands for a radical of the benzene series wherein one of the ortho-positions to the phthalimide-radical is non-substituted with an acid condensing agent containing chlorine in its molecule.

4. A process which comprises treating at an elevated temperature a compound of the following formula:

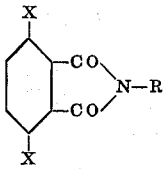

wherein X stands for hydrogen or chlorine and R stands for a radical of the benzene series wherein one of the ortho positions to the phthalimide-radical is non-substituted, in the presence of a flux with an acid condensing agent containing chlorine in its molecule.

5. A process which comprises treating at a temperature of between 200° C. and 350° C. a compound of the following formula:

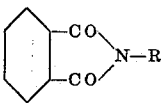

wherein R stands for a radical of the benzene series wherein one of the ortho-positions to the phthalimide-radical is unsubstituted, with aluminium chloride.

6. A process which comprises treating at a temperature of about from 200° C. to 350° C. a compound of the following formula:

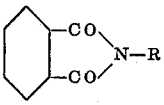

wherein R stands for a radical of the benzene series wherein one of the ortho-positions to the phthalimide-radical is unsubstituted, in the presence of a flux with aluminium chloride.

7. A process which comprises treating at a temperature of about from 200° C. to 350° C. a compound of the following formula:

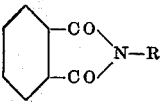

wherein R stands for a radical of the benzene series wherein one of the ortho-positions to the phthalimide radical is unsubstituted, with molten sodium aluminium chloride.

8. A process which comprises treating at a temperature of about from 270° C. to 300° C. a compound of the following formula:

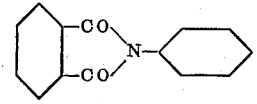

with molten sodium aluminium chloride.

9. The compounds of the following formula:

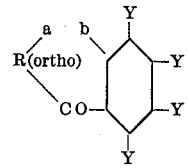

wherein R stands for a radical of the benzene series, Y for hydrogen or a substituent of the group consisting of halogen and alkyl, and wherein $a$ represents the carboxylic acid group and $b$ represents the amino group, or $a$ and $b$ jointly stand for the group —CO—NH—.

10. The compounds of the following formula:

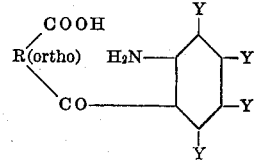

wherein R stands for a radical of the benzene series, Y for hydrogen or a substituent of the group consisting of halogen or alkyl.

11. The compounds of the following formula:

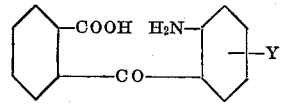

wherein Y stands for halogen or alkyl.

12. The compound of the following formula:

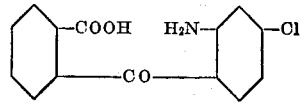

which compound forms yellow prisms and melts at 204° C. to 205° C. with transformation into the lactam.

ARTHUR WOLFRAM.
EMIL HAUSDÖRFER.